United States Patent [19]
Schmid et al.

[11] Patent Number: 4,853,145
[45] Date of Patent: Aug. 1, 1989

[54] ALKYL AND ALKENYL DIETHANOLAMINE COMPOUNDS AS SOLUBILIZERS FOR LOW-FOAM SURFACTANTS

[75] Inventors: Karl-Heinz Schmid, Mettmann; Adolf Asbeck, Duesseldorf; Detlev Stanislowski, Mettmann, all of Fed. Rep. of Germany

[73] Assignee: Henkel Kommanditgesellschaft auf Aktien, Duesseldorf, Fed. Rep. of Germany

[21] Appl. No.: 136,048

[22] Filed: Dec. 21, 1987

[30] Foreign Application Priority Data

Dec. 22, 1986 [DE] Fed. Rep. of Germany ....... 3643934

[51] Int. Cl.[4] ..................... B01D 19/02; C11D 1/835; C11D 3/30; C11D 17/08

[52] U.S. Cl. .................................... 252/136; 252/142; 252/148; 252/173; 252/174.21; 252/174.22; 252/328; 252/358; 252/363.5; 252/529; 252/548; 252/DIG. 1; 252/DIG. 14

[58] Field of Search .............. 252/544, 174.21, 174.22, 252/DIG. 1, 136, 142, 148, 529, 548, 363.5, DIG. 14, 173, 328, 358

[56] References Cited

U.S. PATENT DOCUMENTS

| | | | |
|---|---|---|---|
| 1,836,047 | 12/1931 | Somerville | 252/544 |
| 4,124,517 | 11/1978 | Hisamoto et al. | 252/89 R |
| 4,142,999 | 3/1979 | Bloching et al. | 252/544 |
| 4,272,394 | 6/1981 | Kaneko | 252/99 |
| 4,303,544 | 12/1981 | Kosswig et al. | 252/174.21 |
| 4,405,511 | 9/1983 | Hasenclever | 252/547 |
| 4,548,729 | 10/1985 | Schmid et al. | 252/174.21 |
| 4,719,044 | 1/1988 | Piorr et al. | 252/548 |
| 4,744,923 | 5/1988 | Piorr et al. | 252/174.21 |

FOREIGN PATENT DOCUMENTS 3625078 7/1986 Fed. Rep. of Germany .

*Primary Examiner*—Dennis Albrecht
*Assistant Examiner*—Ron Krasnow
*Attorney, Agent, or Firm*—Wayne C. Jaeschke; Henry E. Millson, Jr.; Daniel S. Ortiz

[57] ABSTRACT

Aqueous low-foam cleaning compositions containing at least one surfactant which is a water-soluble or water-emulsifiable polyalkylene glycol ether of a long-chain alcohol, and at least one diethanolamine derivative of the formula

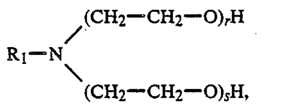
(I)

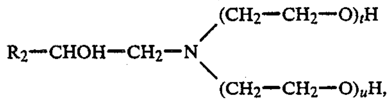

(IIa)

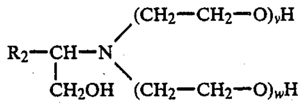

(IIb)

in which $R_1$ and $R_2$ are linear or branched alkyl or alkenyl radicals containing 8 to 14 carbon atoms for $R_1$ and 9 to 17 carbon atoms for $R_2$, and r, s, t, u, v and w are integers of from 1 to 3.

15 Claims, No Drawings

ALKYL AND ALKENYL DIETHANOLAMINE COMPOUNDS AS SOLUBILIZERS FOR LOW-FOAM SURFACTANTS

BACKGROUND OF THE INVENTION

1. Field of the Invention:

This invention relates to compositions containing low-foam surfactants in which alkyl and/or alkenyl diethanolamine compounds are present as solubilizers.

2. Statement of Related Art:

U.S. Pat. No. 4,548,729 relates to the use of selected polyethylene glycol ethers corresponding to the following formula $$R^1-O-(CH_2CH_2O)_n-R^2 \quad \text{(I)}$$

in which $R^1$ is a linear or branched chain $C_8$–$C_{18}$ alkyl or alkenyl radical, $R^2$ is a $C_4$–$C_8$ alkyl radical, and n is a number of from 7 to 12, as foam-inhibiting additives for low-foam cleaning preparations. In the above formula, n is preferably a number of from 8 to 10, the preferred radical $R^2$ is the n-butyl radical, and the preferred value for n is the number 9. The terminally blocked polyglycol ethers of this type are preferably used in such quantities that their concentration in the ready-to-use cleaning solutions is from 10 to 2500 ppm and preferably from 50 to 500 ppm. These terminally blocked adducts of ethylene oxide with relatively longchain alcohols are useful both with respect to their performance properties and above all with respect to their biological degradability.

However, in the practical application of surfactant components of this kind, it has been found that they develop their optimum activity at temperatures of about 50° C. and higher, whereas at lower temperatures improvements in their foaming behavior appear desirable, particularly when they are used in cleaning processes which promote foaming from the mechanics of the process. Copending application Ser. No. 077,257, filed July 24, 1987 to Schmid et al. relates to improvements in this class of biologically degradable low-foam surfactants. This earlier application relates to low foam or rather foam-inhibiting surfactant mixtures based of water-soluble and/or water-emulsifiable polyalkylene glycol ethers of relatively long-chain alcohols, wherein these surfactant mixtures contain components I, II and, if desired, III identified below in the following quantitative ratios (the quantities in % by weight each being based on the total weight of the mixture of components I to III):

(I) from 20 to 80% by weight polyethylene glycol ethers corresponding to general formula I $$R_1-O-(CH_2CH_2O)_n-R_2 \quad \text{(I)}$$

in which $R_1$ is a linear or branched $C_8$–$C_{18}$ alkyl or alkenyl radical, $R_2$ is a $C_4$–$C_8$ alkyl radical and n is a number of from 3 to 7, (II) from 10 to 40% by weight alkyl polyalkylene glycol mixed ethers corresponding to general formula II $$R_3-O-(CH_2CH_2O)_x-(CH_2-\underset{CH_3}{\underset{|}{CH}}O)_y-H \quad \text{(II)}$$

in which $R_3$ is a linear or branched $C_8$–$C_{18}$ alkyl radical, x is a number of from 1 to 3 and y is a number of from 3 to 6, and (III) from 0 to 40% by weight alkyl (poly)propylene glycol ethers corresponding to general formula III $$R_4-O-(CH_2\underset{CH_3}{\underset{|}{C}}HO)_z-H \quad \text{(III)}$$

in which $R_4$ is a linear or branched $C_{16}$–$C_{22}$ alkyl or alkenyl radical and z is a number of from 1 to 3.

The parts by weight of components I to III preferably lies within the following quantitative ranges:

compounds of general formula I: 50 to 80% by weight
compounds of general formula II: 10 to 30% by weight
compounds of general formula III: 0 to 20% by weight.

For further details, reference is made to the disclosure of the above-mentioned U.S. Pat. No. 4,548,729 and copending application Ser. No. 077,257, of which the disclosures are specifically incorporated by reference herein.

In the meantime, it has been found that surfactants or surfactant mixtures of the type described in the above patent and pending application can be in need of improvement due to the following problems.

At low temperatures such as may prevail for example in practical application in winter, the surfactants can separate from their aqueous solutions. Aqueous solutions of low-foam surfactant components, particularly those described in U.S. Pat. No. 4,548,729, show corresponding separation, for example at temperatures below 5° C. Also, improved solubilities are desirable in another special field of application, i.e., in preferably strongly acidic cleaning formulations. Low-foam surfactants of the described type show inadequate solubility, for example, in formulations containing phosphoric acid, particularly at high phosphoric acid contents.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to close the gaps still existing in the dissolving behavior of the above desirable low-foam surfactant components through the co-use of selected solubilizers without, at the same time, adversely affecting the existing advantages of these surfactant components and, more particularly, their foam-inhibiting or rather low-foam properties. It has now been discovered that by co-use of selected diethanolamine derivatives, increased temperature ranges of in-use conditions of the above surfactant types are obtained.

Accordingly, the present invention relates to diethanolamine derivatives corresponding to general formulae I, IIa and/or IIb:

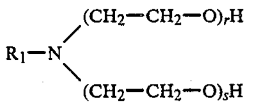
(I)

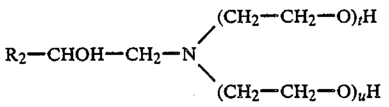
(IIa)

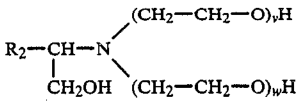
(IIb)

in which $R^1$ and $R_2$ are linear and/or branched alkyl and/or alkenyl radicals containing 8 to 14 carbon atoms for $R_1$ and 9 to 17 carbon atoms for $R_2$, and r, s, t, u, v and w are integers of from 1 to 3, as solubilizers for surfactants or surfactant mixtures based on water-soluble and/or water emulsifiable polyalkylene glycol ethers of relatively long-chain alcohols, particularly where they are used in low-foam cleaning preparations at low temperatures and/or in the acidic range.

The solubilizers corresponding to general formulae I, IIa and/or IIb are used in quantities of from 5 to 150% by weight, and preferably in quantities of from 5 to 100% by weight, based in each case on the weight of the low-foam surfactants.

Solubilizers corresponding to general formula I can be prepared in known manner as specific compounds, for example from diethanolamine and alkyl halides containing the indicated number of carbon atoms in the alkyl radical. The solubilizers corresponding to general formulae IIa and IIb are usually obtained as mixtures. They are readily obtained by reaction of terminal epoxide compounds containing the above-described number of carbon atoms with diethanolamine and accumulate in known manner (depending on the reaction conditions applied) in the form of a mixture of the two components IIa and IIb. These compounds I, IIa and IIb are then further reacted as required with ethylene oxide.

The compounds of formulae I and II are known compounds, and are commercially available. For example, compounds of Formula I are available under the trade names Araphen TM K 100 and Araphen TM T 100 from Henkel KGaA, Duesseldorf, Federal Republic of Germany and Genamin TM products from Hoechst AG, Frankfurt, Federal Republic of Germany. Compounds of formula II are available under the trade names Araphen TM G2D and Araphen TM G2D10 from Henkel KGaA.

In a first important embodiment, the solubilizers according to the invention are used together with the terminally blocked polyethylene glycol ethers according to U.S. Pat. No. 4,548,729, these ethers in the context of the present invention having the following general formula $$R_3\text{—O—}(CH_2CH_2O)_n\text{—}R_4 \quad \text{(III).}$$

In this formula, $R_3$ is a linear or branched $C_8$–$C_{18}$ alkyl or alkenyl radical, $R_4$ is a $C_4$–$C_8$ alkyl radical and n is a number of from 7 to 12. The preferred value for n is 8 to 10, more especially 9, while the preferred meaning of $R_4$ is the n-butyl radical. As already set forth above, reference is made to the disclosure of U.S. Pat. No. 4,548,729 for further particulars.

In another preferred embodiment of the invention, the solubilizers according to the invention corresponding to general formulae I, IIa and/or IIb are used together with low-foam or foam-inhibiting surfactant mixtures of the type described in copending application Ser. No. 077,257. In the context of the present specification, these surfactant mixtures can be defined as mixtures of components of compounds IV to VI below.

(a) from 20 to 80% by weight polyethylene glycol ethers corresponding to general formula IV $$R_5\text{—O—}(CH_2CH_2O)_p\text{—}R_6 \quad \text{(IV)}$$

in which $R_5$ is a linear or branched $C_8$–$C_{18}$ alkyl or alkenyl radical, $R_6$ is a $C_4$–$C_8$ alkyl radical, and p is a number of from 3 to 7, (b) from 10 to 40% by weight alkyl polyalkylene glycol mixed ethers corresponding to general formula V

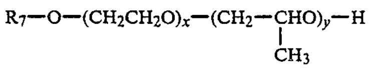
(V)

in which $R_7$ is a linear or branched $C_8$–$C_{18}$ alkyl radical, x is a number of from 1 to 3, and y is a number of from 3 to 6, (c) from 0 to 40% by weight alkyl (poly)propylene glycol ethers corresponding to general formula VI

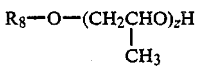
(VI)

in which $R_8$ is a linear or branched $C_{16}$–$C_{22}$ alkyl or alkenyl radical and z is a number of from 1 to 3.

The compounds corresponding to general formula IV can be produced in accordance with U.S. Pat. No. 4,548,729, but with the difference that, in U.S. Pat. No. 4,548,729, the degree of ethoxylation n corresponds to a number of from 7 to 12 whereas, according to the invention, n is a number of from 3 to 7. Accordingly, suitable starting materials for the production of the polyglycol ethers corresponding to formula I are corresponding fatty alcohols and/or oxoalcohols containing the number of carbon atoms indicated either individually or in admixture with one another. These alcohols are reacted with ethylene oxide in a molar ratio of from 1:3 to 1:7, after which the hydroxyl groups present in the reaction product obtained are etherified. The reaction with ethylene oxide takes place under known alkoxylation conditions, preferably in the presence of alkaline catalysts. The etherification of the free hydroxyl groups is preferably carried out under the known conditions of Williamson etherification with straight-chain or branched $C_4$–$C_8$ alkyl halides, for example with n-butyl iodide, sec.-butyl bromide, tert.-butyl chloride, amyl chloride, tert.-amyl bromide, n-hexyl chloride, n-heptyl bromide and n-octyl chloride. As already discussed above, the corresponding $C_4$-alkyl halides are preferably used for this purpose. It is advisable to use the alkyl halide and alkali in a stoichiometric excess, for example of from 100 to 200%, over the hydroxyl groups to be etherified.

The compounds corresponding to formulae V and VI are also produced in known manner by reaction of the starting alcohols or alcohol mixtures with ethylene oxide and propylene oxide (compounds of general formula V) and with propylene oxide (compounds of general formula VI) under known alkoxylation conditions.

The details of copending application Ser. No. 077,257 also apply to the present invention; accordingly, components IV to VI are preferably present in the following proportions:

IV: from 50 to 80% by weight
V: from 10 to 30% by weight
VI: from 0 to 20% by weight.

In the preferred embodiment, the radical $R_5$ in the compounds of general formula IV is a linear or branched $C_{12}$–$C_{18}$ alkyl or alkenyl radical, while the preferred radical $R_6$ in the compounds of general formula IV is the butyl radical. In the compounds of general formula V, the preferred meaning for the radical $R_7$ is a linear or branched $C_{12}$–$C_{14}$ alkyl radical while the preferred chain length for the radical $R_8$ in the compounds corresponding to general formula VI is 16 to 18 carbon atoms.

The radicals $R_5$, $R_7$ and $R_8$ are radicals of corresponding rela tively long-chain alcohols. In another preferred embodiment of the invention, alcohol cuts of the type which accumulate in practice in the synthesis of such alcohols are particularly suitable, in which case at least the predominant proportion of the individual components actually present in those alcohol cuts corresponds to the chain length range indicated. Such alcohols are corresponding synthesis alcohols, but more especially corresponding fatty alcohols or fatty alcohol mixtures of the type obtained in known manner from the conversion of natural fats and/or oils.

One particularly suitable alcohol cut for the radical $R_5$ in the compounds corresponding to general formula IV is so-called "LT cocosalcohol" which has the following carbon chain length distribution (for saturated hydrocarbons only):

$C_{10}$; 0 to 3%; $C_{12}$; 48 to 58%; $C_{14}$; 19 to 24%; $C_{16}$; 9 to 12%; $C_{18}$; 11 to 14%.

A particularly suitable radical $R_8$ in the compounds corresponding to general VI is an oleyl alcohol cut having the following carbon chain length distribution and an iodine number in the range of from 40 to 110:

$C_{12}$; 0 to 2%; $C_{14}$; 0 to 9%; $C_{16}$; 2 to 33%; $C_{18}$; 60 to 95%; $C_{20}$; 0 to 3%.

In the aqueous cleaning compositions of the invention, from 10 to 2500 ppm, preferably from 50 to 500 ppm of the compound of formula III of the invention or the mixture of compounds IV to VI are present therein.

The improved behavior of corresponding surfactant mixtures containing a solubilizer according to the invention compared with corresponding surfactant mixtures containing no added solubilizer is apparent from the following Examples and Comparison Examples.

In addition to the solubilizing properites, the foaminhibiting properties of the surfactant mixtures, particularly at an in-use temperature of 20° C., are also improved by the use of the diethanolamine derivatives corresponding to formulae I, IIa and/or IIb, as can be seen from the following Table. The foaminhibiting properties of the surfactant mixtures are determined by adding a high-foam surfactant (triethanolamine salt of tetrapropylenebenzene sulfonate) to the surfactant mixture to be tested in the quantities indicated in the Table and foaming these mixtures by pumping them around. The lower the figures indicated in the Table for liquid and foam volume the better the foam-inhibiting properties of the surfactant mixture and the more the surfactant mixture can be charged with the high-foam surfactant until the maximum number of 2000 ml liquid and foam volume is reached.

The invention will be illustrated but not limited by the following examples.

EXAMPLES

EXAMPLE 1

40% phosphoric acid, 85%
6% oleyl alcohol-2PO
2% cocosalcohol-5EO-butylether
2% cocosalcohol-2EO-4PO
10% product of formula II a/b with $R_2=C_{11}$, and t, u, v, and w are all 1.
40% water This mixture is a clear liquid in the temperature range of from −5° C. to 50° C.

COMPARISON EXAMPLE 1

40% phosphoric acid, 85%
12% oleyl alcohol-2PO
4% cocosalcohol-5EO-butylether
4% cocosalcohol-2EO-4PO
40% water This mixture is cloudy at 20° C. and separates into an oil phase and an aqueous phase after a few hours.

COMPARISON EXAMPLE 2

40% phosphoric acid, 85%
20% cocosalcohol-10EO-butylether
40% water

This mixture is a clear liquid at temperatures above +5° C. to +50° C. Separations occur after prolonged storage below 5° C.

EXAMPLE 2

20% phosphoric acid, 85%
10% cocosalcohol-10EO-butylether
2% product of formula II a/b with $R_2=C_{11}$, and t, u, v and w are all 1.
68% water This mixture is a clear liquid at temperatures in the range from −5° C. to +50° C.

EXAMPLE 3

In the mixture of Example 1, the solubilizer II a/b used in accordance with the invention is replaced by a solubilizer of general formula I in which $R_1$ is a $C_{12}$ radical, and r and s are both 1.

The mixture is a clear liquid at temperatures in the range from −5° C. to +50° C.

EXAMPLE 4

The mixture of Example 2 according to the invention is varied by replacing the solubilizer of formula II a/b with a diethanolamine derivative of general formula I in which $R_1$ is a $C_{12}$ radical and r and s are both 1.

This mixture is also a clear liquid at −5° C. to +50° C.

EXAMPLE 5

The foaming behavior of some of the surfactant mixtures described above was determined as follows:

Test method 300 ml of a 1% aqueous sodium hydroxide solution were stored at 20° C. and 65° C. in a double-walled 2-liter measuring cylinder. 0.5 ml of a concentrate as described in Example 1 and 2 and in Comparison Examples 1 and 2 was then added and the solution pumped in at 4 liters/min. After 30 seconds, 1 ml of a 1% aqueous solution of the triethanolamine salt of tetrapropylenebenzene sulfonate was added to the solution and the volume formed by liquid and foam was determined after another 30 seconds.

The 30-second determinations (addition/reading) were repeated until the surfactant solution had foamed to 2000 ml in the measuring cylinder.

TABLE

| Addition of ml test foam generator | Example 1 20° C. | Example 1 65° C. | Comparison Example 1 20° C. | Comparison Example 1 65° C. | Comparison Example 2 20° C. | Comparison Example 2 65° C. | Example 2 20° C. | Example 2 65° C. |
|---|---|---|---|---|---|---|---|---|
| | (figures represent sum of liquid and foam volume) | | | | | | | |
| 0 | 320 | 300 | 300 | 300 | 400 | 300 | 380 | 320 |
| 1 | 360 | 360 | 320 | 340 | 460 | 320 | 420 | 340 |
| 2 | 360 | 360 | 340 | 340 | 580 | 340 | 440 | 340 |
| 3 | 380 | 360 | 340 | 340 | 680 | 360 | 480 | 380 |
| 4 | 400 | 380 | 360 | 340 | 800 | 380 | 540 | 380 |
| 5 | 440 | 380 | 360 | 340 | 1000 | 400 | 660 | 380 |
| 6 | 460 | 380 | 400 | 340 | 1400 | 420 | 720 | 420 |
| 7 | 480 | 400 | 440 | 360 | 1600 | 460 | 800 | 460 |
| 8 | 480 | 440 | 480 | 380 | 1820 | 580 | 880 | 600 |
| 9 | 500 | 500 | 500 | 420 | 2000 | 680 | 900 | 900 |
| 10 | 500 | 580 | 540 | 500 | | 940 | 940 | 1200 |
| 11 | 500 | 800 | 580 | 620 | | 1100 | 960 | 1500 |
| 12 | 500 | 1060 | 600 | 840 | | 1240 | 960 | 2000 |
| 13 | 500 | 1260 | 660 | 1200 | | 1380 | 1000 | |
| 14 | 500 | 1480 | 760 | 1440 | | 1740 | 1040 | |
| 15 | 500 | 1740 | 900 | 1740 | | 2000 | 1140 | |
| 16 | 500 | 2000 | 1160 | 2000 | | | 1220 | |
| 17 | 500 | | 1540 | | 1480 | 1480 | 1480 | |
| 18 | 500 | | 1800 | | 1760 | 1760 | 1760 | |
| 19 | 500 | | 2000 | | 2000 | 2000 | 2000 | |

We claim:

1. In an aqueous low-foam cleaning composition containing at least one surfactant comprising either at least one surfactant of the formula:

$$R_3-O-(CH_2CH_2O)_n-R_4 \quad (III)$$

in which $R_3$ is a linear or branched $C_8$-$C_{18}$ alkyl or alkenyl radical, $R_4$ is a $C_4$-$C_8$ alkyl radical, and n is a number of from 7 to 12, or a mixture of (i) polyethylene glycol ethers corresponding to general formula IV $$R_5-O-(CH_2-CH_2O)_p-R_6 \quad (IV)$$

in which $R_5$ is a linear or branched $C_8$-$C_{18}$ alkyl or alkenyl radical, $R_6$ is a $C_4$-$C_8$ alkyl radical, and p is a number of from 3 to 7, and (ii), alkyl polyalkylene glycol mixed ethers corresponding to general formula V

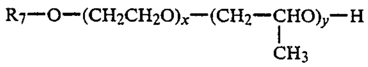

(V)

in which $R_7$ is a linear or branched $C_8$-$C_{18}$ alkyl radical, x is a number of from 1 to 3, and y is a number of from 3 to 6, the improvement comprising the presence therein of a solubilizing-effective quantity of at least one diethanolamine derivative of the formula

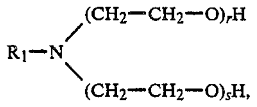

(I)

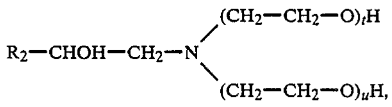

(IIa)

(IIb)

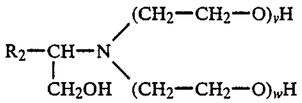

in which $R_1$ and $R_2$ are linear or branched alkyl or alkenyl radicals containing 8 to 14 carbon atoms for $R_1$ and 9 to 17 carbon atoms for $R_2$, and r, s, t, u, v and w are intergers of from 1 to 3.

2. The composition of claim 1 wherein the at least one diethanolamine derivative is present in a quantity of from about 5 to about 150% by weight, based on the weight of the at least one surfactant.

3. The composition of claim 2 wherein said quantity is from about 5 to about 100% by weight.

4. The composition of claim 1 wherein the at least one surfactant is at least one surfactant of the formula:

$$R_3-O-(CH_2CH_2O)_n-R_4 \quad (III)$$

in which $R_3$ is a linear or branched $C_8$-$C_{18}$ alkyl or alkenyl radical, $R_4$ is a $C_4$-$C_8$ alkyl radical, and n is a number of from 7 to 12.

5. An acidic cleaning composition of claim 1.

6. A cleaning composition of claim 5 containing phosphoric acid.

7. An aqueous low-foam cleaning composition comprising:

A. from about 10 to about 2500 ppm of a surfactant component which is either (a) at least one surfactant of the formula:

$$R_3—O—(CH_2CH_2O)_n—R_4 \quad \text{(III)}$$

in which $R_3$ is a linear or branched $C_8$–$C_{18}$ alkyl or alkenyl radical, $R_4$ is a $C_4$–$C_8$ alkyl radical, and n is a number of from 7 to 12; or (b) a mixture of (i) from about 20 to about 80% by weight polyethylene glycol ethers corresponding to general formula IV $$R_5—O—(CH_2CH_2O)_p—R_6 \quad \text{(IV)}$$

in which $R_5$ is a linear or branched $C_8$–$C_{18}$ alkyl or alkenyl radical, $R_6$ is a $C_4$–$C_8$ alkyl radical, and p is a number of from 3 to 7;

(ii) from about 10 to about 40% by weight alkyl polyalkylene glycol mixed ethers corresponding to general formula V

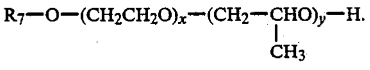

in which $R_7$ is a linear or branched $C_8$–$C_{18}$ alkyl radical, x is a number of from 1 to 3, and y is a number of from 3 to 6;

(iii) from 0 to about 40% by weight alkyl (poly)-propylene glycol ethers corresponding to general formula VI

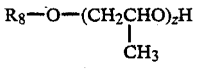

(VI)

in which $R_8$ is a linear or branched $C_{16}$–$C_{22}$ alkyl or alkenyl radical and z is a number of from 1 to 3; the percentages by weight being based on the weight of the mixture; and B. from about 5 to about 150% by weight, based on the weight of component A, of at least one diethanolamine derivative of the formula

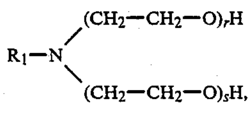

(I)

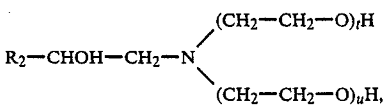

(IIa) or

-continued

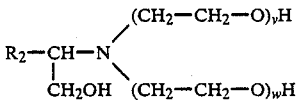

(IIb)

in which $R_1$ and $R_2$ are linear or branched alkyl or alkenyl radicals containing 8 to 14 carbon atoms for $R_1$ and 9 to 17 carbon atoms for $R_2$, and r, s, t, u, v and w are integers of from 1 to 3.

8. The composition of claim 7 wherein from about 5 to about 100% by weight of component B is present therein.

9. The composition of claim 7 wherein from about 50 to about 500 ppm of component A is present therein.

10. The composition of claim 9 wherein from about 5 to about 100% by weight of component B is present therein.

11. A method of enhancing the solubility of the surfactant component of an aqueous low-foam composition for use at low temperatures or in the acidic range or both containing at least one surfactant of the formula:

$$R_3—O—(CH_2CH_2O)_n—R_4 \quad \text{(III)}$$

in which $R_3$ is a linear or branched $C_8$–$C_{18}$ alkyl or alkenyl radical, $R_4$ is a $C_4$–$C_8$ alkyl radical, and n is a number of from 7 to 12, or a surfactant mixture of (i) from about 20 to about 80% by weight polyethylene glycol ethers corresponding to general formula IV $$R_5—O—(CH_2CH_2O)_p—R_6 \quad \text{(IV)}$$

in which $R_5$ is a linear or branched $C_8$–$C_{18}$ alkyl or alkenyl radical, $R_6$ is a $C_4$–$C_8$ alkyl radical, and p is a number of from 3 to 7;

(ii) from about 10 to about 40% by weight alkyl polyalkylene glycol mixed ethers corresponding to general formula (V)

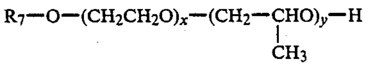

(V)

in which $R_7$ is a linear or branched $C_8$–$C_{18}$ alkyl radical, x is a number of from 1 to 3 and y is a number of from 3 to 6; and (iii) from 0 to about 40% by weight alkyl (poly)propylene glycol ethers corresponding to general formula VI

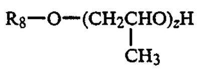

(VI)

in which $R_8$ is a linear or branched $C_{16}$–$C_{22}$ alkyl or alkenyl radical and z is a number of from 1 to 3; the percentages by weight being based on the weight of the mixture, comprising adding thereto a solubilizing-effective quantity of at least one diethanolamine derivative of the formula

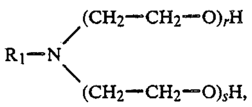

(I)

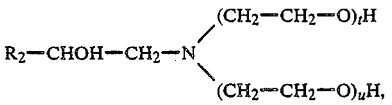

(IIa)

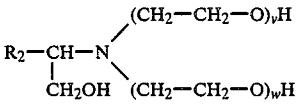

(IIb)

in which $R_1$ and $R_2$ are linear or branched alkyl or alkenyl radicals containing 8 to 14 carbon atoms for $R_1$ and 9 to 17 carbon atoms for $R_2$, and r, s, t, u and v and w are integers of from 1 to 3.

12. The method of claim 11 wherein the at least one diethanolamine derivative is present in the composition in a quantity of from about 5 to about 150% by weight, based on the weight of the at least one surfactant.

13. The method of claim 12 wherein said quantity is from about 5 to about 100% by weight.

14. The method of claim 11 wherein from about 10 to about 2500 ppm of the surfactant is present in the composition.

15. The method of claim 14 wherein from about 50 to about 500 ppm of the surfactant is present in the composition.

* * * * *